(No Model.)  3 Sheets—Sheet 1.
W. SCHLUER.
BICYCLE.
No. 599,152. Patented Feb. 15, 1898.
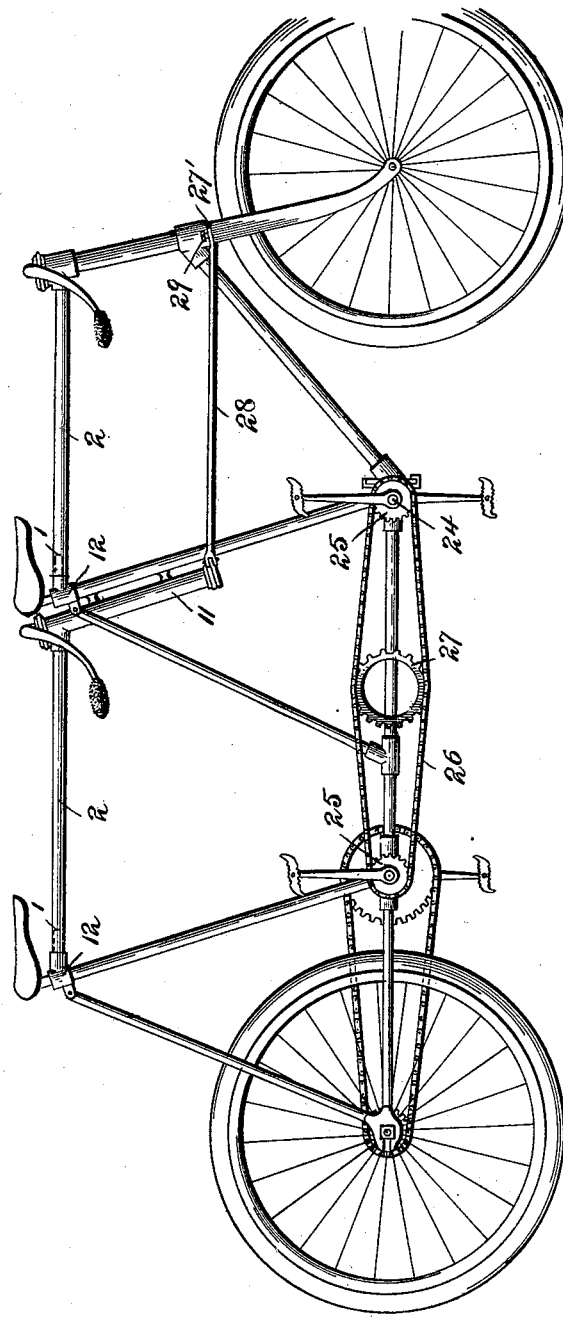
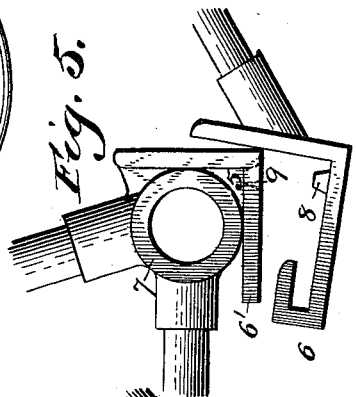
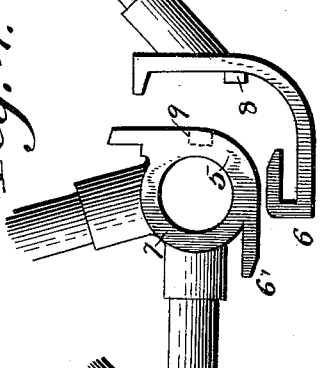
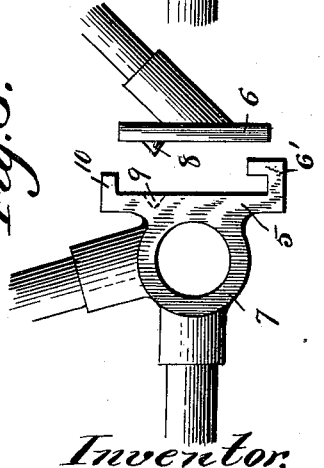
Witnesses:
Inventor:
William Schluer
by Benj. R. Catlin
atty.

(No Model.) 3 Sheets—Sheet 2.
W. SCHLUER.
BICYCLE.
No. 599,152. Patented Feb. 15, 1898.
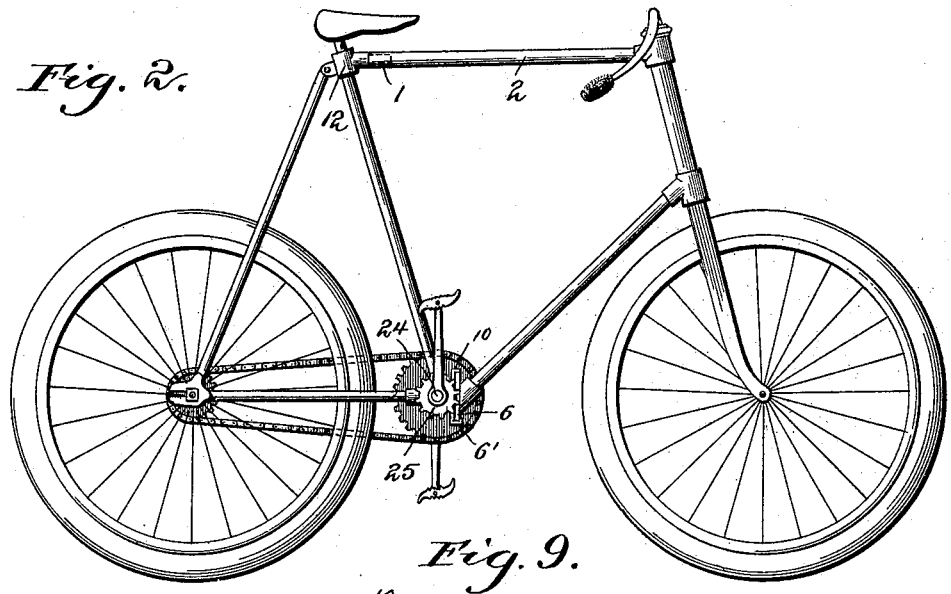
Fig. 2.
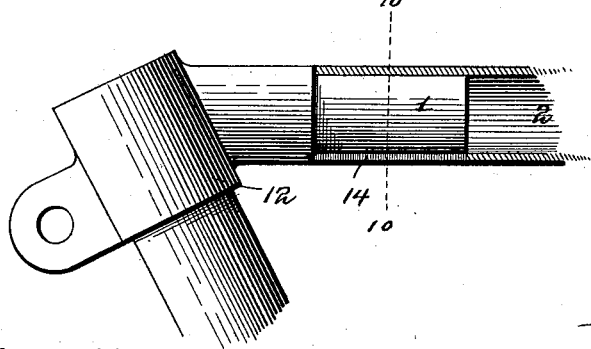
Fig. 9.
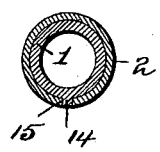
Fig. 10.
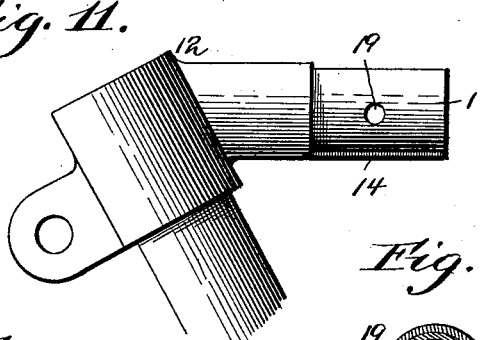
Fig. 11.
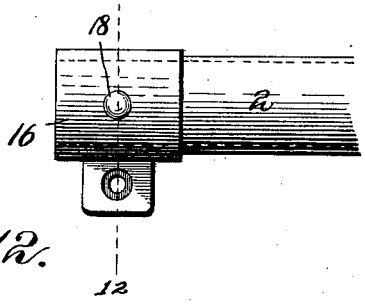
Fig. 11ª.
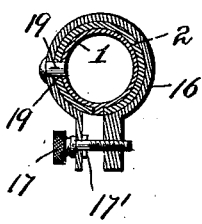
Fig. 12.
Witnesses:
J. B. McGirr.
Rich'd Emmet
Inventor.
William Schluer
by Benj. R. Catlin
atty.
THE NORRIS PETERS CO., PHOTO-LITHO., WASHINGTON, D. C.

(No Model.) 3 Sheets—Sheet 3.
W. SCHLUER.
BICYCLE.

No. 599,152. Patented Feb. 15, 1898.

Witnesses:
J. B. McGirr.
Archit Emmons

Inventor:
William Schluer
by Benj. R. Catlin
atty

THE NORRIS PETERS CO., PHOTO-LITHO., WASHINGTON, D. C.

UNITED STATES PATENT OFFICE.

WILLIAM SCHLUER, OF TERRE HAUTE, INDIANA, ASSIGNOR TO MARTHA SCHLUER, OF SAME PLACE.

BICYCLE.

SPECIFICATION forming part of Letters Patent No. 599,152, dated February 15, 1898.

Application filed October 17, 1895. Serial No. 565,987. (No model.)

*To all whom it may concern:*

Be it known that I, WILLIAM SCHLUER, a resident of Terre Haute, in the county of Vigo and State of Indiana, have invented certain new and useful Improvements in Bicycles; and I do hereby declare the following to be a full, clear, and exact description of the invention, such as will enable others skilled in the art to which it pertains to make and use the same.

The invention relates to velocipedes, and has for its object to provide a simple, secure, and easily removable and replaceable frame-section in a bicycle or the like, whereby a single bicycle can be converted into a tandem or the reverse; and it consists in the construction hereinafter described and particularly pointed out.

Figure 6:
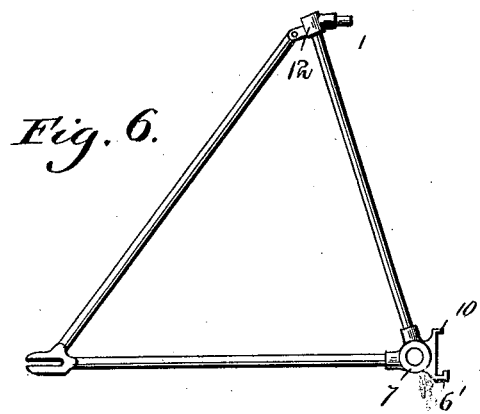
Figure 8:
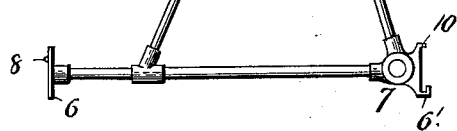
Figure 7:
Figure 13:
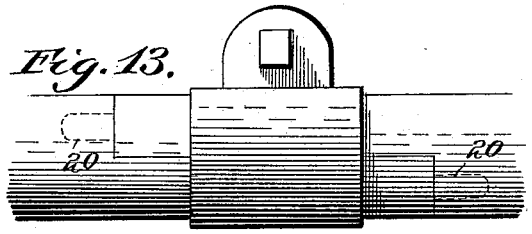
Figure 14:
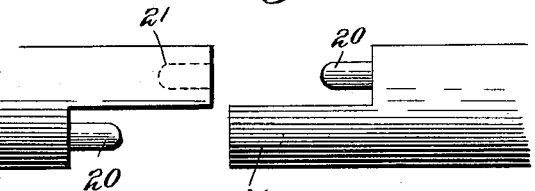
Figure 15:
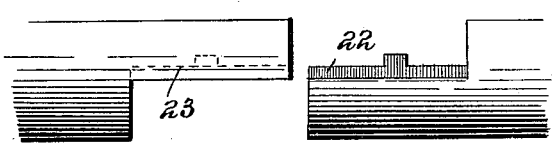
Figure 16:
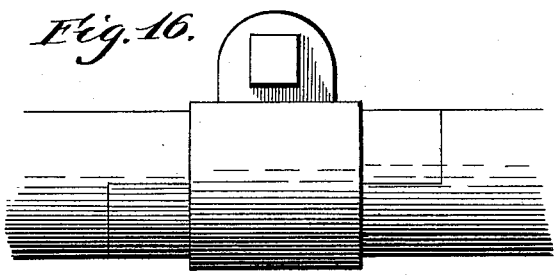
Figure 17:
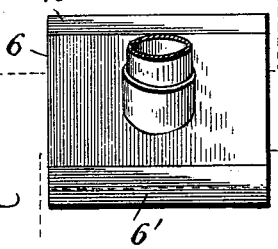

In the accompanying drawings, Figure 1 is a side elevation of the bicycle having the tandem arrangement. Fig. 2 is a like view of the bicycle arranged for a single rider. Figs. 3, 4, and 5 are side elevations, on an enlarged scale, of three modifications of a coupling device, the parts being shown disconnected. Figs. 6, 7, and 8 are side elevations, respectively, of front, rear, and intermediate frame-sections. Fig. 9 is a similar view, on an enlarged scale, of a portion of the front frame-section. Fig. 10 is a section of the same on line 10 10. Fig. 11 is an elevation of a modification of the coupling indicated in Fig. 9, parts of the front and intermediate frames ready to be coupled being shown. Fig. 12 is a transverse section on line 12 12, taken after the parts are coupled. Figs. 13 and 16 are elevations of modified couplings; and Figs. 14 and 15 are respectively views of the same devices, the parts being separated and the clamping-ring omitted. Fig. 17 is a plan of a detail.

The front section of the bicycle-frame is of usual construction, except as it is modified to connect at will either with an intermediate removable frame-section or with a rear section. Likewise the rear frame-section is of usual form, excepting the provision made for coupling it either with the intermediate or front sections. The detachable intermediate section is of novel form and comprises a triangle of tubes or rods provided with an open handle-bar support 11 and an opening or socket at 12 to receive a short seat-post. The lower side of said triangle of the intermediate section is prolonged, as shown, and to or near the vertex of the triangle and preferably to the handle-bar support is fixed a tube 2, parallel to said prolonged base, said base and the rear side of the triangle being preferably composed of two parallel tubes, as indicated in Fig. 8.

Referring to Figs. 6, 7, and 8, numeral 1 denotes studs or short posts, either solid or tubular, situated at the upper angle of the rear and intermediate frames, respectively, and adapted each to enter the tubular end of a horizontal member 2, respectively, of the front and intermediate frame-sections.

The front and intermediate frame-sections are each provided at their lower rear angle with a shoe or socket 5, having a bent flange 6', and the intermediate and rear sections are each provided with a foot or plate 6, each adapted to be snugly seated in one of said shoes, the foot of the intermediate section fitting the shoe in the front section and the foot of the rear section fitting the shoe either of the intermediate or front sections, according as the parts are coupled.

The shoe 5 is preferably made as wide or wider than the length of hub 7 and integral therewith, whereby a stable bearing between the sections is afforded, the corresponding foot or plate attached to the connecting-frame being also made wide. The construction whereby this hub 7 of the pedal-shaft is utilized to support a member of the frame-coupling is deemed important.

8 indicates pins fixed to the coupling-plates 6 and adapted to enter suitable holes 9 in the sockets 5 when the frames are coupled, and at such time the upper edge of the plate 6 fits under the flange 10 of the socket and its lower edge fits within a suitably-bent flange 6'. This flange 6', or a stop substantially resembling it in effect and providing a positive obstruction to any separation of the counterparts of the coupling in the direction in which the upper coupling can separate, is important to prevent the disengagement of the frames. One of the frames can be easily sprung to permit the parts 6 and 5 to be slipped together, as well as the parts 2 and 1, and the frames are securely coupled by mere assemblage. The action of the rider's hands on the handle-bars, as well as the resistance of the forward wheel when pushed ahead, aids the friction of the socket and post in maintaining the upper connection in the only direction in which separation is possible, and the flange or stop 6', having a face transverse to said direction and engaging a like face of its counterpart, positively prevents a direct uncoupling of the lower connection lengthwise of the machine and therefore resists the uncoupling of the upper connection. The characteristic of this improvement is that the couplings are not separable in the same direction. It is further characteristic of the improvement that the couplings are so formed and related that the frames can be coupled by springing one of them. Such springing to permit a reverse operation—namely, an uncoupling—is automatically resisted by the rider.

If desired, a supplemental stop or pin 8 may be used to prevent uncoupling in sidewise direction, though the wide bearing-faces of the plates afford considerable security in this respect. The particular form of these stops is not essential, provided they do not prevent easy coupling of the parts by mere assemblage and provided they act substantially as set forth to obviate uncoupling.

Plates 6 and sockets 5 have bearing-faces in a plane transverse to the length of the machine nearly as wide in all directions in said plane as the distance between the pedal-shaft cranks, as shown in Fig. 17, whereby they are specially adapted to withstand the various strains that tend to separate them. These plates and sockets can be slipped together at the time the upper sockets and posts are so joined, a frame or frames being slightly sprung, if necessary, to facilitate the operation. The various couplings having been thus joined and the plates entered behind and under their retaining-flanges and the pins entered in their corresponding holes, the frames are suitably coupled and also locked.

The parts 1 may be provided with ribs 14, fitting corresponding slots 15 in the wall of tubes 2 to lock the parts against rotation. (See Figs. 9 and 10.) The frames, either two or three of them, having been coupled at the lower and upper levels by the means above described and by simply assembling the parts by slipping together the parts of the couplings, are held with sufficient practical security to permit the bicycle to be used either as a single or tandem machine, as the case may be; but for entire security under exceptional circumstances and during prolonged use it is preferred to clamp the socket of tube 2 upon its post by a single hand-operated clamp that locks both couplings.

In Figs. 11 and 12 is shown a clamping-ring 16, provided with a tightening-screw 17. This screw is provided with a transverse pin 17' or the like, whereby unscrewing will positively expand the split ring. A pin fixed in the ring is denoted by 18, and 19 is a hole in the post to receive said pin. These latter devices may be substituted for the rib and slot or combined with them. The use of the slot in tube 2, either with or without the pin connection, is preferred, because it coöperates with the clamp and permits the tube to be compressed upon the post. The pin 18 is short, as represented, and will not prevent the slipping of the clamping-ring before the latter has been tightened on the tube by the thumb-screw.

Modifications of the above-described coupling are shown in Figs. 13 to 16, in which 20 denotes pins, and 21 sockets therefor. As shown in Fig. 15, a feather 22, adapted to enter a slot 23, may be employed, and with such construction a pin connection can also be used to more effectually guard against endwise movement. The operation of the clamping-ring in these modified devices is obvious. Either of these couplings and clamps, or others like them, can be employed to rigidly couple and lock the former together, and the construction of the lower frame-coupling is such that it is simultaneously locked. To separate the frames, it is only necessary to loosen the clamping-ring, whereupon the frames can be readily detached. The simple securing device is advantageously situated at the top of the machine and conveniently accessible, and it is of practical importance that a single securing device easily manipulated by the fingers is made sufficient by the construction to securely lock the frames together.

Modifications of the lower coupling are clearly shown in Figs. 4 and 5, in which a flange 6'' is shown adapted to be slipped under a bent flange 6'''. While the wide shoe or socket made integral with the hub 7 is preferred, it is obvious that others—such, for example, as those shown in Figs. 9 to 16—might be used, though without securing all the advantages of the preferred form.

The rear and intermediate frames each have a hanger provided with a tubular bearing 7 to receive a pedal-shaft 24, and upon the end of said shaft or axles are fixed sprocket-wheels 25 to receive a chain 26, whereby both pedals may be made to coöperate in driving the rear wheel.

27 denotes a loose sprocket-wheel held between the opposite parts of the chain and adapted to be adjusted to or from the driving sprocket-wheels to take up the slack of the chain.

To the foot of the handle-bar post at 27 is connected a steering-rod 28, connected to the forked member of the front frame by a thumb-screw or like device 29. This rod is pivotally connected to and carried by the detachable frame through the medium of the said handle-bar post and its socket. Obviously the steering-bar 28 could be omitted in the tandem arrangement, if desired.

Many of the details herein described or illustrated may be varied and equivalents employed without departing from the invention.

In assembling the frames the counterparts of the couplings are simply pushed or slipped together in an operative connection, and the couplings are therefore slip-couplings, or they comprise slip-joints. Each and every connection is so formed, however, as to prevent with entire certainty any relative vertical movement of the counterparts and also any horizontal movement in a transverse plane. The upper coupling can separate horizontally, but only lengthwise the machine and against the pull of the rider or riders on the handle-bar or handle-bars. The lower couplings also can be separated in the same horizontal plane, but only when one part is tilted. In assembling the frame-sections the parts of the lower coupling are first connected, and then the sections are sprung apart, and the upper coupling parts can then be suitably joined, and the connection thus made cannot be unmade without a reverse springing of the sections. This security adds to that resulting from the pull on the handle-bar or handle-bars, and this double security is independent of any separately-movable fastening devices.

Having thus described my invention, what I claim is—

1. In a velocipede, separable frame-sections having upper and lower couplings one or more of which comprises a socket and a post adapted to enter and leave said socket in one direction and positively precluding separation in all other directions, and comprising also one or more couplings having a stop to prevent all separate movement of either of its counterparts in the said direction of the line of separation of the first-named coupling or couplings, substantially as described.

2. In a velocipede, separable frame-sections having upper and lower couplings one or more of which comprises a socket and a post adapted to enter and leave said socket in one direction and positively precluding separation in all other directions, and comprising also one or more couplings having a stop to prevent all separate movement of either of its counterparts in the said direction of the line of separation of the first-named coupling or couplings, and also having a stop to positively prevent separate transverse movement of said counterparts, substantially as described.

3. In a velocipede, separable frame-sections having upper and lower couplings one or more of which comprises a socket and post adapted to enter and leave said socket in one direction and positively precluding separation in all other directions, and comprising also one or more couplings having a stop to prevent all separate movement of either of its counterparts in the said direction of the line of separation of the first-named coupling or couplings, one of said counterparts being integral with the pedal-shaft hub, substantially as described.

4. In a velocipede, detachable frame-sections provided with couplings one of which comprises a socket and the other a plate, each having a corresponding bearing-face, one of said parts being fixed to the shaft-bearing and the other to the connected section, and one part also being provided with a pin and the other with a seat for the same to prevent the plate and socket sliding on each other, said pin and its seat being situated in the contiguous bearing-faces, substantially as described.

5. In a velocipede, a frame comprising two sections, one of which is provided with a shoe or socket having flanges 6' and 10 and the other with a foot or plate adapted to fit within one of said flanges bent to receive it and under the other, and supplementary couplings whereby the frames are secured together, substantially as set forth.

6. In a velocipede or the like two frames one of which is provided with a shoe or socket having flanges 6' and 10 and the other with a foot or plate adapted to fit within one of said flanges bent to receive it and under the other, in combination with a slip-coupling consisting of a post on one frame and a socket on the other whereby the frames are operatively coupled by simply assembling the parts, substantially as set forth.

7. In a velocipede or the like two frames one of which is provided with a shoe or socket having flanges 6' and 10 and the other with a foot or plate adapted to fit within one of said flanges bent to receive it and under the other, in combination with a slip-coupling consisting of a post on one frame and a socket on the other whereby the frames are operatively coupled by simply assembling the parts, and a positive clamping device for one of the couplings, substantially as set forth.

8. In a velocipede, the removable intermediate frame-section comprising a triangular part, the base and rear sides of said triangle being each composed of parallel tubes or rods tied together, a handle-bar socket supported between said rear tubes and fixed to a front side tube, said parallel base-tubes being each at its front end fixed to the end of a pedal-shaft bearing on each side of the junction of the single front side tube with said bearing and at the other end prolonged beyond the triangle and fixed to a wide coupling-plate, and a tube attached near the vertex of the triangle and parallel to its base, in combination with front and rear wheel-frame sections and with the other parts of a velocipede, substantially as described.

In testimony whereof I have signed this specification in the presence of two subscribing witnesses.

WILLIAM SCHLUER.

Witnesses:
BENJ. R. CATLIN,
FRANK D. BLACKISTONE.